(12) United States Patent
Kojima

(10) Patent No.: US 9,674,401 B2
(45) Date of Patent: Jun. 6, 2017

(54) PRINTING CONTROL METHOD AND PRINTING CONTROL DEVICE

(71) Applicant: SEIKO EPSON CORPORATION, Tokyo (JP)

(72) Inventor: Takayoshi Kojima, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/599,298

(22) Filed: Jan. 16, 2015

(65) Prior Publication Data

US 2015/0202883 A1 Jul. 23, 2015

(30) Foreign Application Priority Data

Jan. 20, 2014 (JP) .................................. 2014-007538

(51) Int. Cl.
*H04N 1/60* (2006.01)
*B41J 2/21* (2006.01)

(52) U.S. Cl.
CPC ............. *H04N 1/60* (2013.01); *H04N 1/6097* (2013.01); *B41J 2/2107* (2013.01)

(58) Field of Classification Search
CPC .... B41J 2/0458; B41J 2/04563; B41J 29/393; B41J 2/04591; B41J 2/04581; B41J 2/2107; H04N 1/6097; H04N 1/60

USPC .......................................................... 347/14
See application file for complete search history.

(56) References Cited

U.S. PATENT DOCUMENTS

2010/0208304 A1* 8/2010 Murase ................... G06T 7/408
358/3.26
2011/0063640 A1* 3/2011 Tanaka ................. H04N 1/6097
358/1.9

* cited by examiner

*Primary Examiner* — Manish S Shah
*Assistant Examiner* — Yaovi M Ameh
(74) *Attorney, Agent, or Firm* — Maschoff Brennan

(57) ABSTRACT

A printing control method includes acquiring colorimetric values of a pattern which is printed on first paper by a printing head which discharges an ink onto the first paper; generating first correction values each for correcting a corresponding one of amounts of the ink to be discharged onto the first paper by the printing head, on the basis of the colorimetric values and reference colorimetric values of the pattern printed on the first paper; generating second correction values on the basis of the first correction values and characteristic conversion coefficients; and when printing is performed on the second paper by the printing head which discharges the ink onto the second paper, correcting each of amounts of the ink to be discharged onto the second paper by the printing head, in accordance with a corresponding one of the second correction values.

4 Claims, 10 Drawing Sheets

FIG. 10

| T1 | |
|---|---|
| INPUT VALUE | OUTPUT VALUE |
| 0 | 0 |
| 1 | 1 |
| 2 | 1 |
| ⋮ | ⋮ |
| Cm | Cm' |
| ⋮ | ⋮ |
| 255 | 238 |

× T0 =

| T2 | |
|---|---|
| INPUT VALUE | OUTPUT VALUE |
| 0 | 0 |
| 1 | 1 |
| 2 | 1 |
| ⋮ | ⋮ |
| Cm | Cm" |
| ⋮ | ⋮ |
| 255 | 241 |

PRINTING CONTROL METHOD AND PRINTING CONTROL DEVICE

CROSS-REFERENCE TO RELATED APPLICATIONS

This application claims priority to Japanese Patent Application No. 2014-007538 filed on Jan. 20, 2014. The entire disclosure of Japanese Patent Application No. 2014-007538 is hereby incorporated herein by reference.

BACKGROUND

1. Technical Field

The present invention relates to a printing control method and a printing control device.

2. Related Art

As is well known, for printers which perform printing by discharging color inks from a printing head thereof, calibration for correcting, for each of the color inks, discharged ink amounts into optimum discharged ink amounts is performed. In such calibration, colorimetric values of a test pattern are obtained by causing a target printer to perform printing of the test pattern on paper, and for each of the color inks, correction values which compensate for differences of the obtained colorimetric values with optimum color values (reference values) of the test pattern are calculated.

Thereafter, in the target printer, for each of the color inks, discharged ink amounts are corrected by the correction values.

A typical printer is capable of performing printing of an image on each of a plurality of types of paper whose characteristics are mutually different. Further, even when, in order to cause a printer to perform printing of the same image on each of two types of paper, an identical set of amounts of an ink is caused to be discharged on each of the two types of paper, two sets of colorimetric values of printed images each printed on a corresponding one of the two types of paper are mutually different because the characteristics of the two types of paper are mutually different. For this reason, the calibration must have been performed for each of the plurality of types of paper whose characteristics are mutually different. That is, correction values calculated on the basis of colorimetric values obtained by performing printing of the test pattern on a certain type of paper (referred to as paper A) are correction values only for use in printing on the paper A.

When, however, calibration for the paper A is desired, the paper A cannot always be prepared only for printing of the test pattern. For example, when a user desires calibration for the paper A, there may be a case where the paper A is not stored near the user, or there may be a case where, even though the paper A is stored near the user, the user is required not to use the paper A as much as possible because the paper A is relatively expensive and is hard to be obtained. In such a case, the calibration for the paper A is difficult to be performed, and this situation has been significantly inconvenient for users.

SUMMARY

An advantage of some aspects of the invention is that a printing control method and a printing control device are provided which make it possible to, even though a type of paper used for printing of a pattern is different from a desired type of paper targeted for calibration, correct discharged ink amounts with accuracy.

According to an aspect of the invention, a printing control method includes acquiring, in a colorimetric value acquisition process, colorimetric values of a pattern which is printed on first paper by a printing head which discharges an ink onto the first paper; generating, in a first correction value generation process, first correction values each for correcting a corresponding one of amounts of the ink to be discharged onto the first paper by the printing head, on the basis of the colorimetric values and reference colorimetric values of the pattern printed on the first paper; generating, in a second correction value generation process, second correction values on the basis of the first correction values and characteristic conversion coefficients for a conversion of a characteristic of the first paper into a characteristic of second paper, a color reproduction range of the characteristic of the second paper being smaller than a color reproduction range of the characteristic of the first paper; and, when printing is performed on the second paper by the printing head which discharges the ink onto the second paper, correcting, in an ink amount correction process, each of amounts of the ink to be discharged onto the second paper by the printing head, in accordance with a corresponding one of the second correction values.

According to the above configuration, when calibration for printing using the second paper is performed (that is, when correction values which are necessary for printing using the second paper and which are applied to amounts of the ink to be discharged onto the second paper are acquired), printing of the pattern is performed by using the first paper whose characteristic is different from that of the second paper. That is, when printing of the pattern is performed, although the first paper is used as a substitution for the second paper, calibration for printing using the second paper can be performed with accuracy. Further, relatively speaking, a conversion of a characteristic having a large color reproduction range into a characteristic having a small color reproduction range is more likely to ensure accuracy of the conversion, as compared with a conversion inverse thereto. Thus, it can be said that the second correction values are sufficiently highly accurate values as correction values applied to amounts of the ink which is discharged onto the second paper when printing using the second paper is performed.

In addition, the first paper is, for example, glossy paper, and the second paper is, for example, mat paper.

According to another aspect of the invention, in the second correction value generation process, the second correction values are generated for each of colors of a plurality of inks including the ink which are discharged by the printing head, and in the ink amount correction process, the amounts of ink for each of colors of the plurality of inks are corrected by using the second correction values for the each of colors of the plurality of inks.

According to the above configuration, for each of colors of the plurality of inks discharged from the printing head, an accurate correction of discharged ink amounts can be made.

Technical thoughts of the invention are not realized by only the aforementioned printing control method. For example, a printing control device including elements (portions) each of which carries out a corresponding one of the processes of the aforementioned printing control method is deemed as an aspect of the invention. Further, the invention is realized in various categories, such as a computer program which causes hardware (a computer) to execute the individual processes of the aforementioned control method, and a computer readable recording medium in which the computer program is recorded.

BRIEF DESCRIPTION OF THE DRAWINGS

The invention will be described with reference to the accompanying drawings, wherein like numbers reference like elements.

FIG. 10 is a diagram that describes a method for generating a second correction table, according to an embodiment of the invention.

DESCRIPTION OF EXEMPLARY EMBODIMENTS

Figure 1:
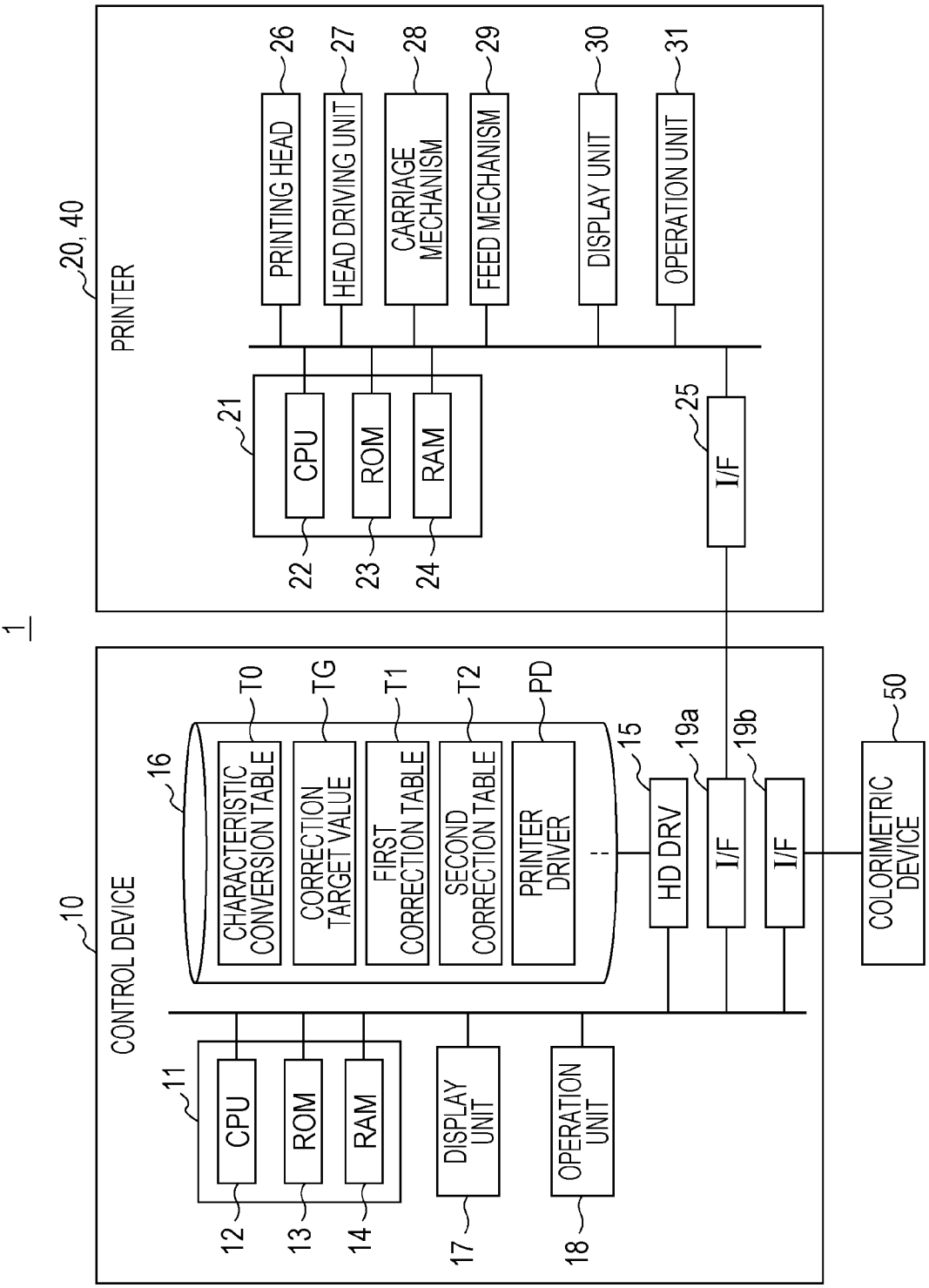
FIG. 1 is a diagram schematically illustrating a configuration of a device according to an embodiment of the invention.

An embodiment of the invention will be described in accordance with the following order:
1. Outline of Configuration of Device
2. Flow of Printing Control processing involving Correction
3. Generation of Characteristic Conversion Table
4. Generation of Correction Target Values
5. Generation of Second Correction Table
6. Summary 1. Outline of Configuration of Device FIG. 1 is a diagram schematically illustrating a configuration of a printing control system 1 according to this embodiment. The printing control system 1 includes a printer 20 and a printing control device (a control device 10) for controlling the printer 20. The printing control device 10 is a device in which a program for controlling the printer 20 is installed, and plays a role as a main body in execution of a printing control method. The control apparatus 10 is typically a personal computer (PC) of a desk top type or a lap top type, but may be a tablet type terminal, a smart phone, or the like. The printing control system 1 may include a colorimetric device 50. The colorimetric device 50 is a device for performing colorimetry of paper on which an image is printed, and corresponds to a colorimeter, an image reading device (a scanner), or the like.

The control device 10, the printer 20, and the like which constitute the printing control system 1 may be separated devices communicably connected to one another or may be a single product resulting from unification thereof. For example, the printer 20 may include the control device 10 as a portion of the body thereof. In this case, the printer 20 including the printing control device 10 in the body thereof becomes a printer 20 corresponding to the printing control system 1 or a printing control device, and such a printer 20 becomes a main body in execution of a printing control method. Further, such a printer 20 corresponding to the printing control system 1 or a printing control device may be a multifunction printer further including the scanner.

The printing control system 1 may further include a reference machine 40. The reference machine 40 is a printer of the same type as that of the printer 20, and is a device which becomes a reference machine for calibration targeted for the printer 20. Through the calibration, it is possible to obtain correction values (a correction table) for the printer 20, which compensate for a deviation of color reproductivity specific to the characteristics of the printer 20 (i.e., a deviation when the color reproductivity of the reference machine 40 is made a baseline), and which thereby makes it possible to reproduce image quality equivalent to that of an image printed by the reference machine 40.

There is a case where a manufacturer of the printer 20 possesses the reference machine 40, and a user of the printer 20 possesses the printing control system 1 including the control device 10 and the printer 20. In this case, as a result, in addition to the control device 10, there exists a control device which controls the reference machine 40 and in which a program for controlling the reference machine 40 is installed. In such a control device for controlling the reference machine 40, for example, functions of "3. Generation of Characteristic Conversion Table" and "4. Generation of Correction Target Values", which will be described below, are implemented. In the following description, for the sake of simplification of description, the control device for controlling the reference machine 40 is supposed to be the control device 10. Actually, the control device 10 may also function not only as the control device for controlling the printer 20, but also as the control device for controlling the reference machine 40.

In the control device 10, a CPU 12, which plays a role as a central portion of arithmetic operation processing, controls the whole of the control device 10 via a system bus. This system bus is electrically connected to a ROM 13, a RAM 14, and various interfaces (an I/F 19a, an I/F 19b, and the like), and is also electrically connected to, via a hard disc drive (HD DRV) 15, a hard disc (HD) 16 which operates as a storage means. The HD 16 is capable of storing therein characteristic conversion tables T0, correction target values TG, first correction tables T1, second correction tables T2, and the like. Further, the HD 16 stores therein an operating system, application programs, a printer driver PD, and the like. These programs are read into the RAM 14 by the CPU 12 when needed and are executed by the CPU 12. In addition, the CPU 12, the ROM 13, and the RAM 14 are collectively called a control unit 11. The I/F 19a is electrically connected to the printer 20 and the reference machine 40; and the I/F 19b is electrically connected to the colorimetric device 50. Further, the control device 10 includes a display unit 17 constituted by, for example, a liquid crystal display; an operation unit 18 constituted by, for example, a keyboard, a mouse device, a touch pad and/or a touch panel; and the like.

Figure 2:
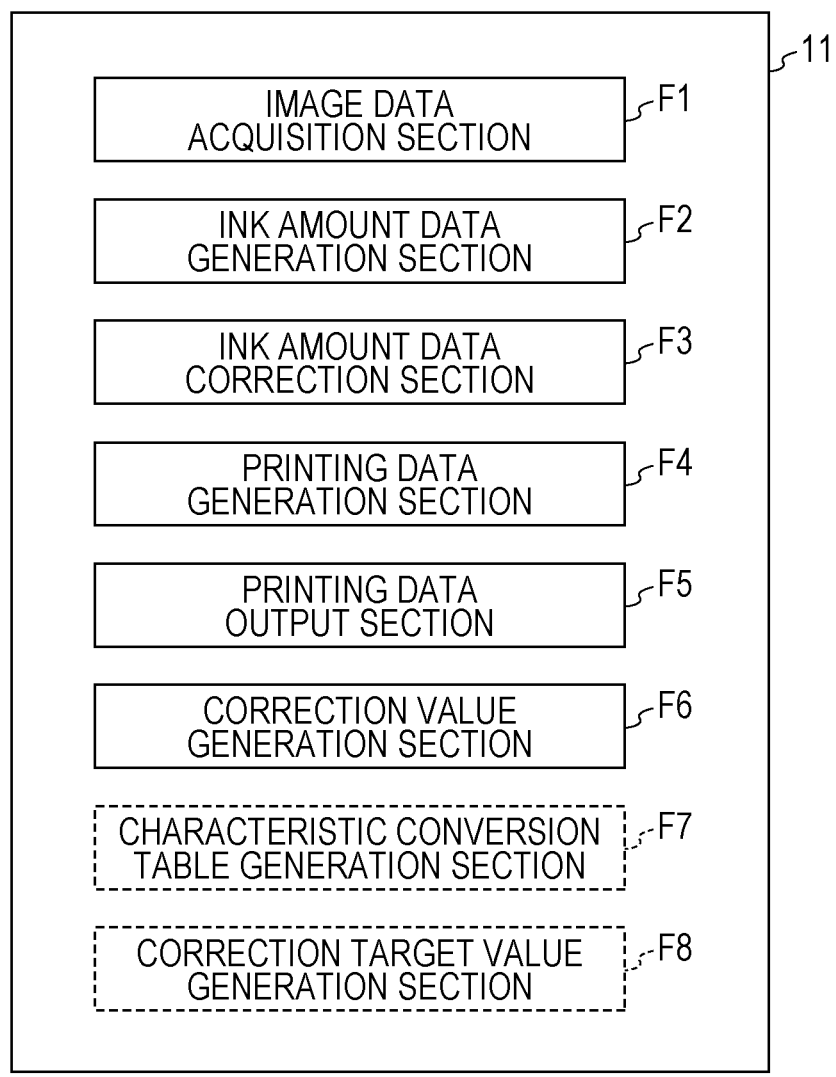
FIG. 2 is a block diagram illustrating individual functions realized by a control unit, according to an embodiment of the invention.

FIG. 2 illustrates individual function sections which operate under the control of the control unit 11 which executes processes in accordance with the printer driver PD. Referring to FIG. 2, the controller 11 controls function sections, such as an image data acquisition section F1, an ink amount data generation section F2, an ink amount data correction section F3, a printing data generation section F4, a printing data output section F5, a correction value generation section F6, a characteristic conversion table generation section F7, a correction target value generation section F8, and the like. These individual sections will be described below.

In the printer 20 (the reference machine 40) (as indicated here by using brackets, in the following description of FIG. 1, "the printer 20" means also "the reference machine 40"), an I/F 25 is communicably connected to the I/F 19a at the control device 10 side via a wired communication link or a wireless communication link, and further, the I/F 25 is electrically connected to a control unit 21, and the like, via a system bus. In the control unit 21, a CPU 22 reads programs (firmware) stored in a ROM 23, or the like, into a RAM 24 when needed, and executes given arithmetic operation processing. The control unit 21 is electrically connected to a printing head 26, a head driving unit 27, a carriage mechanism 28, and a feed mechanism 29, and controls these individual components.

The printing head 26 is supplied with inks each from a corresponding one of ink cartridges (not illustrated) for a plurality of inks, such as a cyan (C) ink, a magenta (M) ink, a yellow (Y) ink, a black (K) ink. The printing head 26 is capable of ejecting (discharging) ink droplets through a plurality of ink discharging holes (nozzles) provided so as to correspond to the plurality of inks. In addition, a total number and colors of inks actually used in the printer 20 are not limited to those described above, and various inks, such as a light cyan ink, a light magenta ink, an orange ink, a green ink, a gray ink, a light gray ink, a white ink, a metallic ink, can be used.

The carriage mechanism 28 causes a carriage (not illustrated) included in the printer 20 to perform reciprocation movement in a predetermined main scanning direction under the control of the control unit 21. The carriage includes the printing head 26 mounted thereon, and the printing head 26 performs reciprocation movement in conjunction with the reciprocation movement of the carriage. The feed mechanism 29 causes a roller and the like (not illustrated) to transport paper in a feed direction intersecting with the main scanning direction, under the control of the control unit 21. The head driving unit 27 generates driving voltages each for driving a piezoelectric element which is provided so as to be associated with a corresponding one of the nozzles of the printing head 26, on the basis of a set of printing data, described below, which is acquired from the control device 10 via the I/F 25 by the control unit 21. The head driving unit 27 outputs the driving voltages to the printing head 26. This output of each of the driving voltages causes a corresponding one of the nozzles of the printing head 26 moving together with the carriage to discharge an ink droplet for each of the inks onto the paper having been transported. Further, the discharged ink droplets are adhered to the paper and dots are formed on the paper. Consequently, an image based on a set of printing data is reproduced on the paper.

Further, the printer 20 includes a display unit 30 constituted by, for example, a liquid crystal display, and an operation unit 31 constituted by, for example, buttons, a touch panel, or the like.

The printer 20 is not limited to a so-called serial printer in which, as described above, the printing head 26 moves along the main scanning direction. For example, the printer 20 may be a line printer including a line printer head provided thereon with a plurality of nozzle rows which are arranged in the feed direction and each of which includes nozzles arranged in the main scanning direction and is associated with a corresponding one of the inks. Further, a means for discharging ink droplets through nozzles is not limited to the means employing the piezoelectric elements, and a means for discharging ink droplets through the nozzles by causing heater elements to heat the inks may be employed. Moreover, a printing method employed as a printing method for the printer 20 is not necessarily the above-described ink jet method, and a laser method or a thermal method may be also employed.

2. Flow of Printing Control Processing Involving Correction

Figure 3:
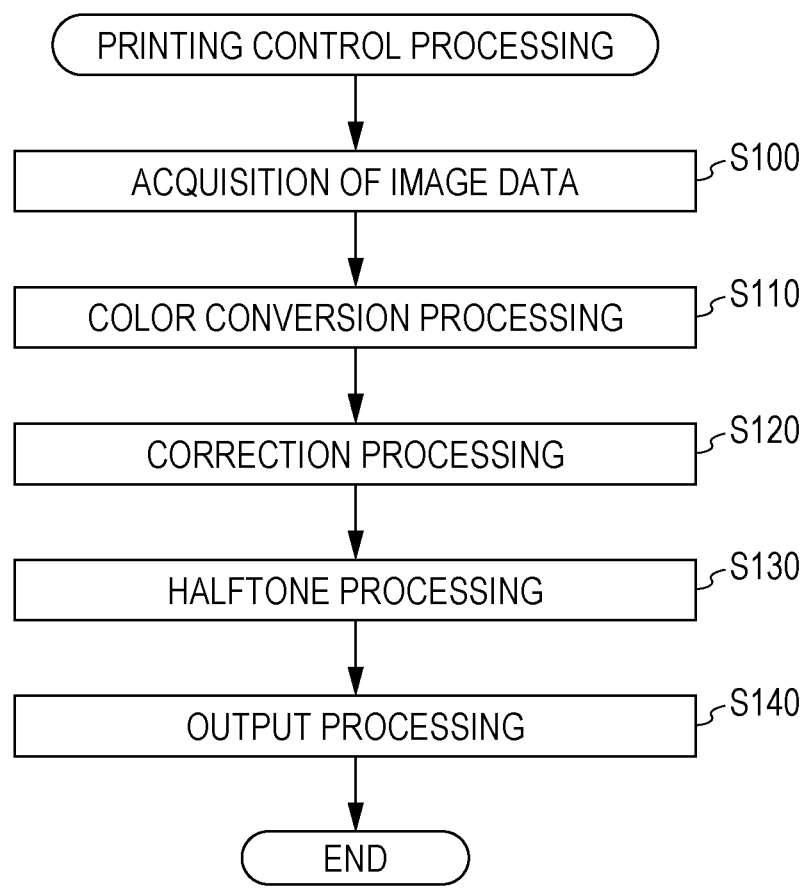
FIG. 3 is a flowchart illustrating printing control processing according to an embodiment of the invention.

FIG. 3 is a flowchart illustrating processing (printing control processing) which is executed in accordance with the printer driver PD by the control device 10 in order to cause the printer 20 to perform printing.

In step S100, the image data acquisition section F1 (refer to FIG. 2) acquires a set of image data, which is associated with an image having been optionally selected by a user, from a predetermined input source. That is, a user can select a set of image data representing any image whose printing is desired by the user by operating the operation unit 18 and the like while viewing a user interface screen image (a UI screen image) displayed on the display unit 17 or the like. An input source from which a set of image data is input is not limited to a particular one, and corresponds to, for example, not only a memory card (not illustrated) inserted into the control device 10 from the outside, but also any image input device communicably connected to the control device 10.

Further, a user can optionally select paper used for printing by the printer 20 from among a plurality of types of paper, and can instruct the control device 10 to use the selected paper. In this embodiment, a user can select paper used for printing from among a plurality of types of paper including at least "first paper" and "second paper". Further, in description of FIG. 3, it is supposed that a user has selected the "second paper" and has instructed the use of the "second paper". The first paper and the second paper in this embodiment have a difference therebetween in color reproductivity. The difference between two kinds of paper in the color reproductivity means that there is a difference between the two kinds of paper in a range of color values (a color reproduction range) which is obtained by performing colorimetry of the two kinds of paper on which the same amounts of ink have been discharged. The second paper has a color reproduction range smaller than that of the first paper.

Specifically, the first paper corresponds to "glossy paper" or the like, and the second paper corresponds to "mat paper" or the like. The glossy paper is paper having a glossy surface; while the mat paper is paper whose surface is subjected to coating treatment for the purpose of deglossing the surface. The glossy paper reflects a larger amount of light, as compared with the mat paper, and thus, a color reproduction range obtained by performing colorimetry of the glossy paper is larger than a color reproduction range obtained by performing colorimetry of the mat paper. In this regard, however, a pair of the first paper and the second paper is not limited to the pair of the glossy paper and the mat paper, and corresponds to any pair of two types of paper which are mutually different in color reproductivity. For example, out of two types of paper selected from among some types of paper each of which has a smaller gloss degree than that of the glossy paper and has a larger gloss degree than that of the mat paper, one type of paper having a larger color reproduction range can be made the first paper, and the other one type of paper having a smaller color reproduction range can be made the second paper.

A format of a set of image data acquired in step S100 is, for example, a bit map format (a raster format), and has, for each pixel, grayscale values each associated with a corresponding one of colors red (R), green (G), and blue (B). Further, when the acquired set of image data does not conform to such an RGB display color system, the image data acquisition section F1 converts the acquired set of image data into a set of image data represented by the RGB display data system. Moreover, the image data acquisition section F1 can perform resolution conversion processing and/or image quality correction processing on the set of image data when needed.

In step S110, the ink amount data generation section F2 (refer to FIG. 2) performs color conversion on the set of image data having been subjected to the processing in step S100. That is, the ink amount data generation section F2 converts a display color system of the set of image data into an ink display color system for use in printing by the printer 20. As described above, in the case where the set of image data is represented by RGB grayscale values for each pixel, the ink amount data generation section F2 convers, for each pixel, the RGB grayscale values into CMYK grayscale values. Hereinafter, a set of image data, which, as a result of the color conversion, is represented, for each pixel, by the CMYK grayscale values, will be called a set of ink amount data. Further, it can be said that each of the CMYK grayscale values, which constitute the set of ink amount data, represents an ink amount of a corresponding one of the CMYK colors. The color conversion processing can be performed by referring to a given color conversion lookup table. Each of the CMYK colors for each pixel in the set of ink amount data is represented by one of 256 grayscale values from "0" to "255".

In step S120, the ink amount data correction section F3 (refer to FIG. 2) corrects the set of ink amount data having been obtained in step S110 by using the second correction tables T2 (refer to FIGS. 1 and 10) corresponding to a type of paper used for printing. As described above, the second paper (for example, mat paper) is designated, as paper for use in printing, by a user. For this reason, the ink amount data correction section F3 reads out the second correction tables T2 corresponding the second paper from the HD 16 or the like, and corrects CMYK grayscale values per pixel, which constitute the set of ink amount data, on the basis of the read-out second correction tables T2. The correction tables T2 are prepared such that each of the correction tables T2 is associated with a corresponding one of the CMYK ink colors, and thus, each of the CMYK grayscale values per pixel, which constitute the set of ink amount data, is corrected by using a corresponding one of the second correction tables T2.

Each of the second correction tables T2 corresponds to "second correction values" in appended claims. Further, processing in step S120 corresponds to "an ink amount correction process" in appended claims. When the correction of the set of ink amount data is made by using the second correction tables T2 and printing based on a set of ink amount data resulting from the above correction and subsequent processes in steps S130 and S140 described below is performed by the printer 20, colors of an image printed on the second paper become substantially equal to colors of an image which is printed on the second paper by the reference machine 40 on the basis of the set of ink amount data as of before the above correction. A method for generating the second correction tables T2 will be described in "5. Generation of Second Correction Table".

In step S130, the printing data generation section F4 (refer to FIG. 2) performs halftone processing (halftoning) on a set of ink amount data resulting from the processing in step S120. A concrete means for the halftone processing is not specified here. The printing data generation section F4 may perform the halftone processing by means of, for example, dithering using a prescribed dither mask or an error diffusion method. As a result of the halftone processing, a set of halftone data which defines, for each pixel, whether each of the CMYK ink colors is to be discharged, or not, that is, whether a dot corresponding to each of the CMYK ink colors is to be formed, or not, is generated. This set of halftone data corresponds to a set of printing data.

In step S140, the printing data output section F5 (refer to FIG. 2) rearranges the set of printing data having been generated in step S130 into order in which the set of printing data is to be transferred to the recording head 26. As a result of the rearrangement processing, it is determined at which timing and through which nozzle each of ink dots defined by the set of printing data is to be formed, on the basis of a pixel location and an ink color corresponding to the each of ink dots. The printing data output section F5 outputs a set of printing data resulting from the rearrangement processing to the printer 20 side via the I/F 19a, together with pieces of information prescribing other printing conditions (a piece of information designating a type of paper, and the like). Subsequently, the printer 20 performs printing (discharging of ink droplets from the recording head 26) based on the set of printing data having been transmitted from the printing data output section F5, onto the second paper (for example, mat paper).

3. Generation of Characteristic Conversion Table

A method for generating a characteristic conversion table T0 will be described below. The characteristic conversion table T0 corresponds to characteristic conversion coefficients for converting the characteristic of the first paper into the characteristic of the second paper, and is necessary information for generating the above-described second correction tables T2.

Figure 4:
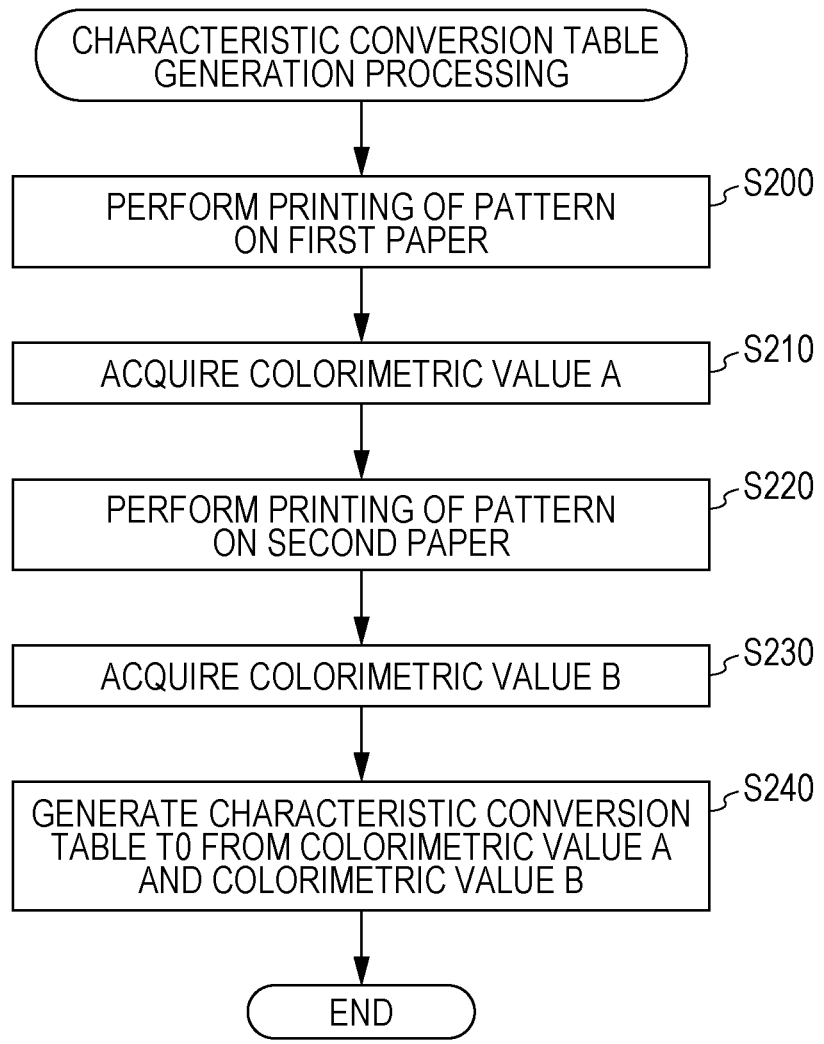
FIG. 4 is a flowchart illustrating characteristic conversion table generation processing according to an embodiment of the invention.

FIG. 4 illustrates characteristic conversion table generation processing by using a flowchart. This processing is performed by using a printer capable of performing printing on the first paper and the second paper, and a control device for controlling the printer. The printer capable of performing printing on the first paper and the second paper may be, for example, the reference machine 40. It is supposed, here, that the characteristic conversion table generation processing is performed by using the reference machine 40 and a control device (for example, the control device 10) for controlling the reference machine 40.

In step S200, the control device 10 causes the reference machine 40 to perform printing of a predetermined test pattern on the first paper (for example, glossy paper) on the basis of a set of test pattern data representing the test pattern. In this case, the test pattern is a test pattern including a plurality of single-color color patches for each of the ink colors CMYK used by the printer 20. That is, the set of test pattern data is a set of ink amount data representing a plurality of color patches, and is prepared in advance. The set of test pattern data includes, for each ink color, patches having a plurality of stages of color density levels. For example, a plurality of color patches corresponding to one ink color are color patches each of which is represented by a corresponding one of a plurality of color density levels (grayscale values) which are placed at constant intervals between a minimum color density level (grayscale value "0") and a maximum color density level (grayscale value "255"). In the set of test pattern data, all pixels representing one color patch have the same grayscale value for one ink color.

In this step S200, just like in step S130, the printing data generation section F4 performs halftone processing on the set of test pattern data and generates a set of printing data. Further, in this step S200, just like in step S140, the printing data output section F5 outputs the set of printing data to the reference machine 40 side, together with pieces of information prescribing other printing conditions (a piece of information designating a type of paper, and the like). As a result of this processing, the test pattern is printed on the first paper by the reference machine 40.

In step S210, the control device 10 acquires colorimetric values of the test pattern having been printed on the first paper in step S200. That is, the control device 10 causes the colorimetric device 50 to perform colorimetry of each of color patches constituting the test pattern having been printed on the first paper and input a result of the colorimetry for each of the color patches to the control device 10 itself. Here, for example, color values each represented by L*, a*, and b* elements in a CIE L*a*b* color space defined by the International Commission on Illumination (CIE) are input as colorimetric values. The colorimetric values of the test pattern printed on the first paper, which have been acquired in step S210, will be called colorimetric values A below for the sake of convenience.

In step S220, the control device 10 causes the reference machine 40 to perform printing of the above test pattern on the second paper (for example, mat paper), on the basis of the set of test pattern data representing the above test pattern. This processing in step S220 is the same as that in step S200 except that used paper is the second paper, and thus, further description of the processing in step S220 is omitted here.

In step S230, just like in step S210, the control device 10 acquires colorimetric values of the test pattern having been printed on the second paper in step S220. The colorimetric values of the test pattern printed on the second paper, which have been acquired in step S230, will be called colorimetric values B below for the sake of convenience.

In addition, order in which the colorimetric values A and the colorimetric values B are acquired is not specified here. That is, the processes may be performed in order inverse to the order shown in FIG. 4, that is, firstly, steps S220 and S230 may be performed to acquire colorimetric values B, and subsequently, steps S200 and S210 may be performed to acquire the colorimetric values A. Alternatively, firstly, steps S200 and S220 may be performed, and subsequently, steps S210 and S230 may be performed.

In step S240, the control device 10 generates the characteristic conversion table T0 from the colorimetric values A and the colorimetric values B having been acquired in such a way as described above, and stores the generated characteristic conversion table T0 into a predetermined storage area (for example, the HD 16 shown in FIG. 1). This processing in step S240 is processing performed by the characteristic conversion table generation section F7 (refer to FIG. 2).

Figure 5:
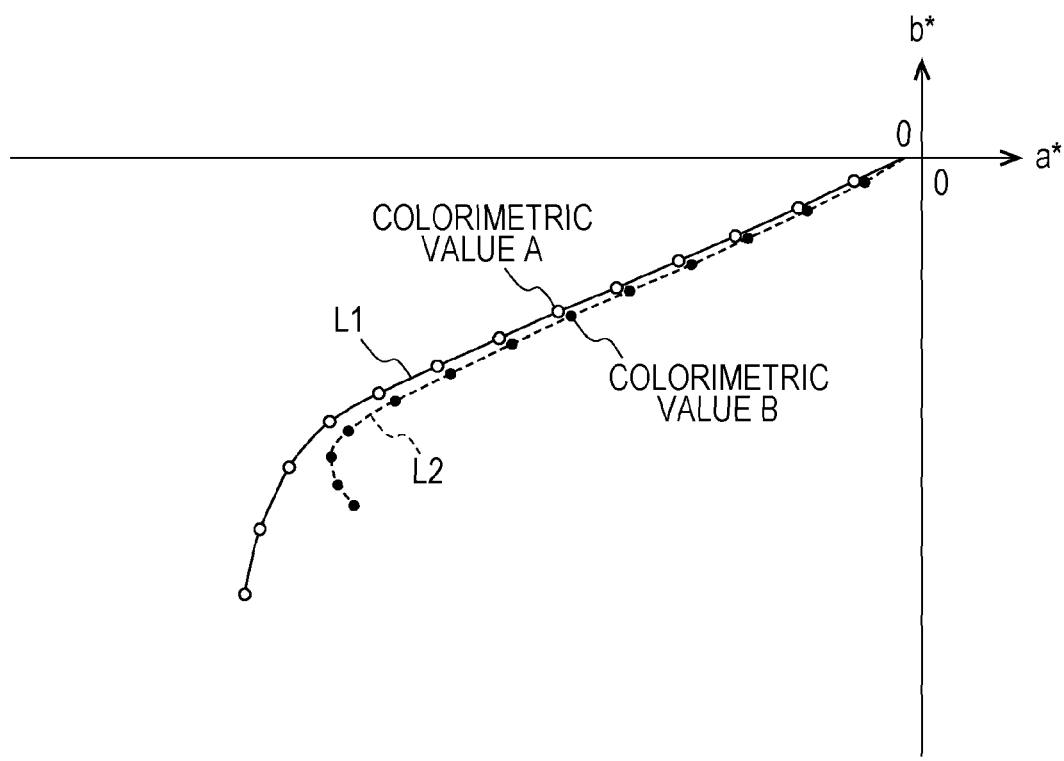
FIG. 5 is a diagram illustrating an example of two kinds of distribution each associated with a set of colorimetric values of a test pattern printed on a corresponding one of first paper and second paper, according to an embodiment of the invention.

FIG. 5 illustrates a diagram resulting from projecting the colorimetric values A and the colorimetric values B on an a*b* plane (for example, L*="0") in the L*a*b* space. Naturally, each pair of one of the colorimetric values A and one of the colorimetric values B has a brightness level L*, but is indicated on the a*b* plane for the sake of simplicity.

Figure 6:
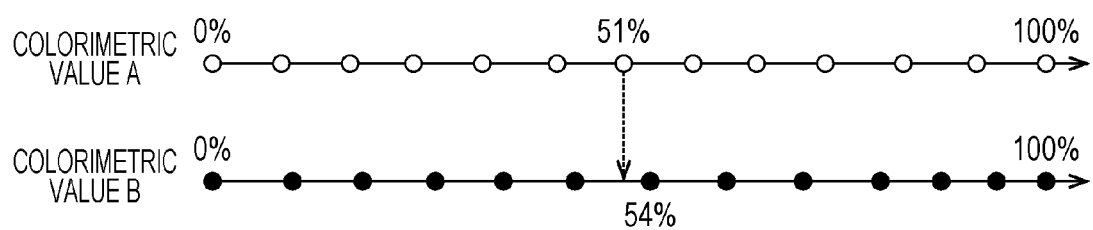
FIG. 6 is a diagram illustrating an example of one-dimensional tables each associated with a set of colorimetric values regarding a corresponding one of mutually different types of paper, according to an embodiment of the invention.

A colorimetric value or a color value in FIG. 5 (and FIG. 6 shown below) is, for example, a value obtained by performing linear addition of elements L*, a*, and b* each resulting from weighting with a predetermined weighting factor. In FIG. 5, as an example, colorimetric values each associated with a corresponding one of color patches for the C ink among the colorimetric values A (i.e., colorimetric values each associated with a corresponding one of color patches for the C ink which have been printed on the first paper) are each denoted by a white dot; while colorimetric values each associated with a corresponding one of color patches for the C ink among the colorimetric values B (i.e., colorimetric values each associated with a corresponding one of color patches for the C which have been printed on the second paper) are each denoted by a black dot. Further, the larger a color density of a color patch (a grayscale value representing a color patch in the set of test pattern data) becomes, both of a corresponding one of such colorimetric values A and a corresponding one of such colorimetric values B basically move further in a direction toward an outer side of the L*a*b* space (i.e., in a direction far from the axis of the brightness L*).

A full line L1 connecting the individual colorimetric values A (the white dots) in FIG. 5 is a straight line (or a curved line) obtained by interpolating the colorimetric values A, and represents a variation of color values, corresponding to a variation of ink amounts (grayscale values 0 to 255) of the C ink, with respect to the first paper. Similarly, a chain line L2 connecting the individual colorimetric values B (the black dots) in FIG. 5 is a straight line (or a curved line) obtained by interpolating the colorimetric values B, and represents a variation of color values, corresponding to a variation of ink amounts (grayscale values 0 to 255) of the C ink, with respect to the second paper. As understood from FIG. 5, even when color patches are printed by an identical printer (for example, the reference machine 40) on the basis of a set of common data (a set of test pattern data), a range of color values obtained from the color patches having been printed on the first paper (i.e., a range of the colorimetric values A) is different from a range of color values obtained from the color patches having been printed on the second paper (i.e., a range of the colorimetric values B), and the range of the colorimetric values A is larger than the range of the colorimetric values B.

When generating the characteristic conversion table T0, the characteristic conversion table generation section F7 firstly converts each of a set of the colorimetric values A and a set of the colorimetric values B into a corresponding one of one-dimensional tables each indicating a degree of a variation of color values relative to each of ink amounts (i.e., each of grayscale values, which represents a corresponding one of color patches).

FIG. 6 illustrates an example of one-dimensional tables each associated with a corresponding one of the set of colorimetric values A and the set of colorimetric values B. For example, in a one-dimensional table based on the set of colorimetric values A, a position of each of the colorimetric values A which is associated with a corresponding one of ink amounts is denoted by a ratio relative to 100% when a colorimetric value A corresponding to a minimum value of the ink amount is made 0% and a colorimetric value A corresponding to a maximum value of the ink amounts is made 100%. Similarly, in another one-dimensional table based on the set of colorimetric values B, a position of each of the colorimetric values B which is associated with a corresponding one of ink amounts is denoted by a ratio relative to 100% when a colorimetric value B corresponding to a minimum value of the ink amount is made 0% and a colorimetric value B corresponding to a maximum value of the ink amounts is made 100%. The characteristic conversion table generation section F7 extracts each of a ratio of a colorimetric value A and a ratio of a colorimetric value B, the colorimetric value A and the colorimetric value B being associated with the same ink amount, from a corresponding one of the one-dimensional tables, and specifies a conversion relation between the extracted ratios. An example of this processing is such that, when, in the one-dimensional table based on the set of colorimetric values A, a ratio corresponding to a certain ink amount is 51%, and in the one-dimensional table based on the set of colorimetric values B, a ratio corresponding to the same ink amount is 54%, a conversion relation from 51% to 54% is specified. The characteristic conversion table generation section F7 repeatedly carries out such a task for specifying a conversion relation between ratios while sequentially selecting each colorimetric value A associated with a corresponding one of grayscale values (ink amounts) with respect to all color patches for the C ink, and thereby generates a table which defines individual conversion relations having been obtained (i.e., the characteristic conversion table T0).

Figure 7:
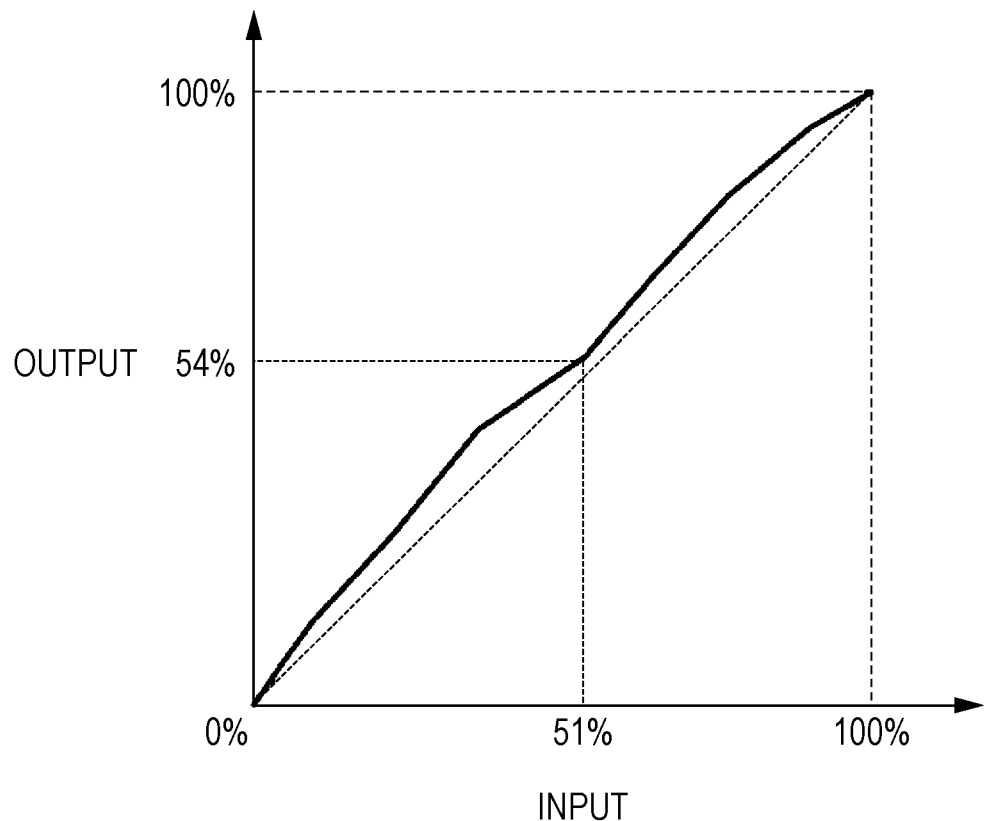
FIG. 7 is a diagram illustrating an example of a characteristic conversion table according to an embodiment of the invention.

FIG. 7 illustrates an example of the characteristic conversion table T0 which has been generated, in such a way as described above, on the basis of two sets of colorimetric values associated with the individual color patches with respect to the C ink. This characteristic conversion table T0 is a table which results from interpolating a conversion relation between ratios, having been specified, in such a way as described above, for each grayscale value of a corresponding one of color patches regarding the C ink, and which continuously defines conversion relations from 0% to 100%. For example, in the characteristic conversion table T0, a characteristic conversion coefficient corresponding to 51% is equal to a value (54/51). It can be said that such a characteristic conversion table T0 is a table for converting a characteristic of a color-value variation in accordance with an ink-amount variation on the first paper into a characteristic of a color-value variation in accordance with an ink-amount variation on the second paper. The characteristic conversion table generation section F7 generates characteristic conversion tables T0 each for a corresponding one of the M, Y, and K inks other than the C ink in the same way as described above.

4. Generation of Correction Target Values

Next, correction target value generation processing will be described. Correction target values TG are target color values which are used for compensating for a deviation of color reproductivity specific to the characteristics of the printer 20, and correspond to "reference colorimetric values" in appended claims. The correction target value generation processing is performed by the correction target value generation section F8 (refer to FIG. 2), and includes a process of causing the reference machine 40 to perform printing of a test pattern on the first paper (for example, glossy paper) and a process of acquiring the correction target values TG by performing colorimetry of the test pattern. The correction target value generation processing is performed by using the reference machine 40 and a control device (for example, the control device 10) for controlling the reference machine 40. In the case where the above characteristic conversion table generation processing has been performed by using the reference machine 40 and a control device (for example, the control device 10) for controlling the reference machine 40, it can be said that this correction target value generation processing has already been performed in steps S200 and S210 shown in FIG. 4. That is, the colorimetric values A correspond to the correction target values T, and are already stored in a predetermined storage area (for example, the HD 16 shown in FIG. 1).

Further, in the case where the correction target value generation processing has been performed by using a device (a printer) different from the reference machine 40 and a control device (for example, the control device 10) for controlling the relevant device, the correction target value generation section F8 performs the same processes as those in steps S200 and S210 shown in FIG. 4 in a configuration in which the reference machine 40 and a control device (for example, the control device 10) for controlling the reference machine 40 are used. As a result of the processing described above, colorimetric values of the test pattern (i.e., respective color patches constituting the test pattern) having been printed on the first paper by the reference machine 40 are acquired as the correction target values TG.

5. Generation of Second Correction Table

Figure 8:
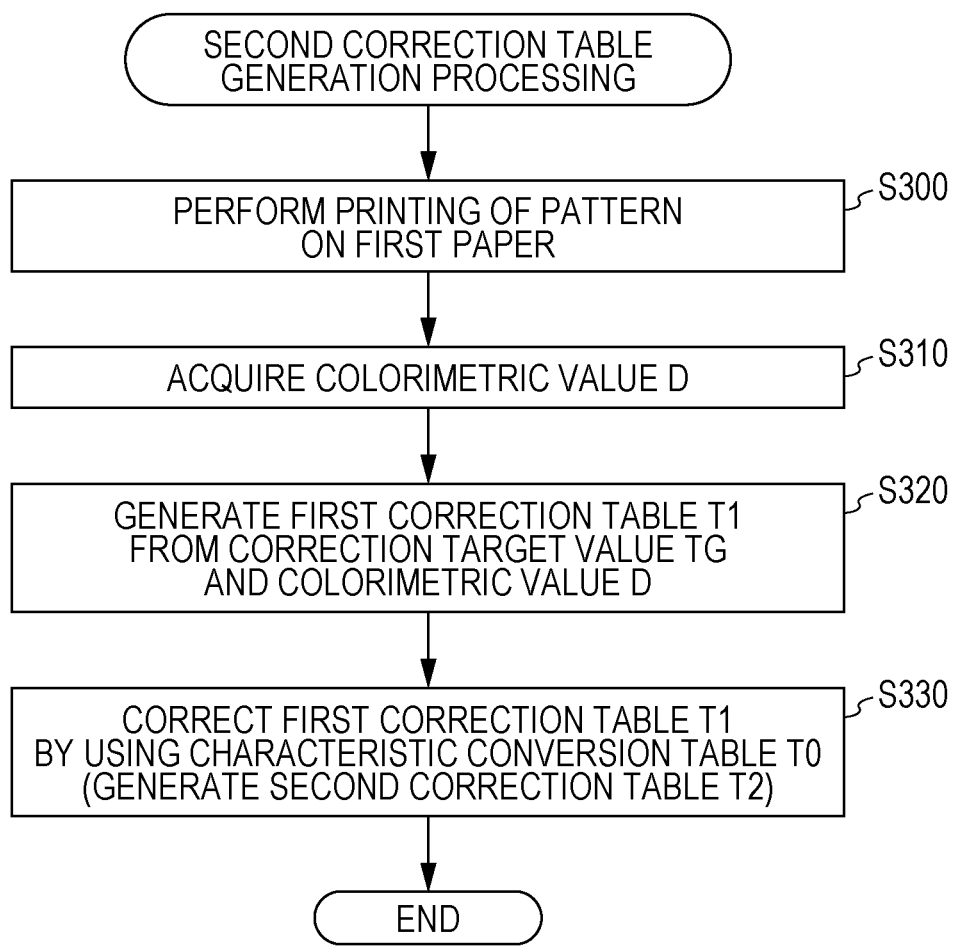
FIG. 8 is a flowchart illustrating second correction table generation processing according to an embodiment of the invention.

FIG. 8 illustrates second correction table generation processing by using a flowchart. This processing is performed by using the printer 20 and the control device 10 for controlling the printer 20. In step S300, the control device 10 causes the printer 20 to perform printing of the test pattern on the first paper (for example, glossy paper). Processing in step S300 is the same as that in step S200 except that a printer which performs printing is the printer 20, and thus, further description is omitted here.

In step S310, the control device 10 acquires colorimetric values of the test pattern having been printed on the first paper in step S300. That is, the control device 10 causes the colorimetric device 50 to perform colorimetry of the individual color patches constituting the test pattern having been printed on the first paper by the printer 200, and input a result of the colorimetry for each of color patches to the control device 10 itself. The colorimetric values of the test pattern printed on the first paper, having been acquired in step S310, will be called colorimetric values D below for the sake of convenience. This processing in step S310 corresponds to "a colorimetric value acquisition process".

In step S320, the control device 10 generates the first correction table T1 from the correction target values TG and the colorimetric values D, and stores the generated first correction table T1 into a predetermined storage are (for example, the HD 16 shown in FIG. 1). Processing in step S320 is processing performed by the correction value generation section F6 (refer to FIG. 2). The first correction table T1 corresponds to "first correction values" in appended claims, and the processing in step S320 corresponds to "a first correction value generation process" in appended claims. In the case where the control device 10 has already performed the above correction target value generation processing, when performing processing in step S320, it is sufficient for the control device 10 merely to read out the correction target values TG having been generated and stored by the control device 10 itself from a predetermined storage area (for example, the HD 16).

Further, in the case where the above correction target value generation processing has been performed by a control device different from the control device 10 (i.e., a control device which is possessed by a manufacturer having manufactured the printer 20 and which controls the reference machine 40), when performing processing in step S320, the control device 10 needs to acquire the correction target values TG from the outside by using an otherwise method. As this otherwise method, there is considered, for example, a method in which the correction target values TG are downloaded from a homepage of the manufacturer into the control device 10 via a network, such as the Internet, or a method in which the correction target values TG are loaded into the control device 10 from a recording medium, such as a CD, in which the correction target values TG are recorded in advance.

Figure 9:
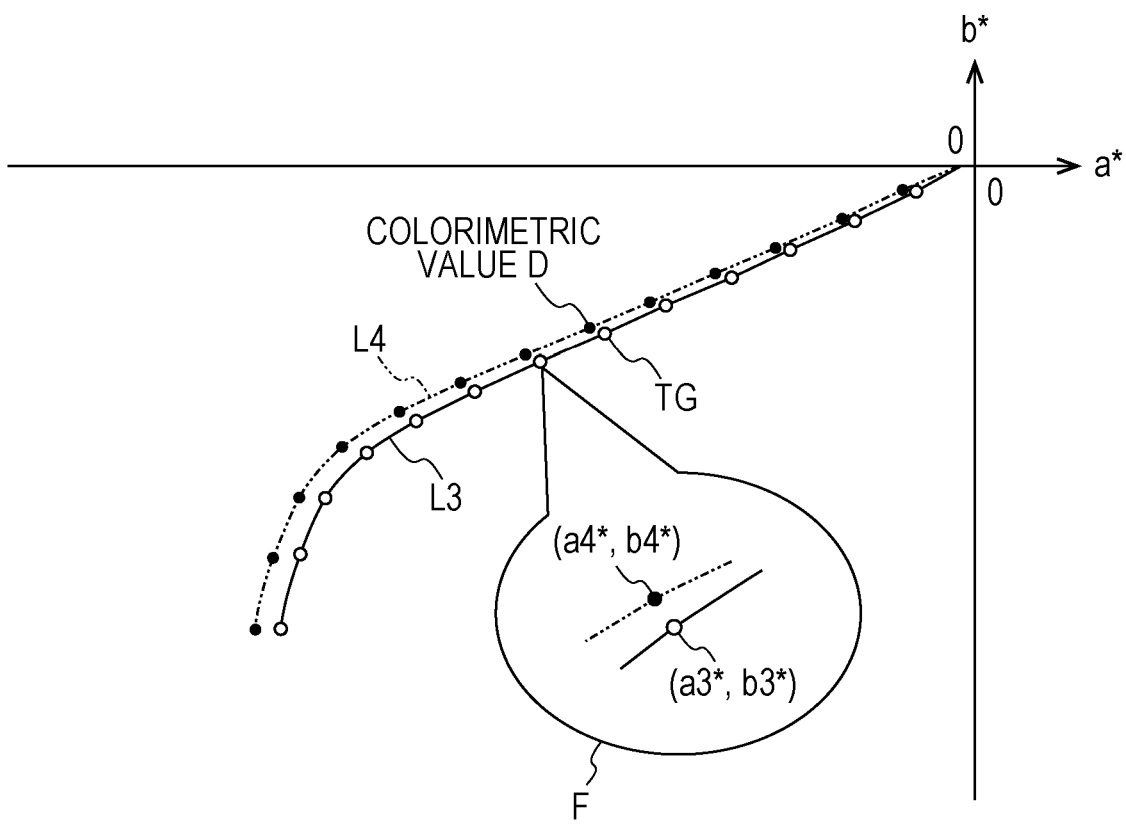
FIG. 9 is a diagram illustrating an example of two kinds of distributions each associated with a set of colorimetric values of a test pattern printed by a corresponding one of mutually different printers, according to an embodiment of the invention.

FIG. 9 illustrates a diagram resulting from projecting the correction target values TG and the colorimetric values D on an a*b* plane (for example, L*="0") in the L*a*b* space. In FIG. 9, as an example, colorimetric values each associated with a corresponding one of color patches for the C ink among the correction target values TG are each denoted by a white dot; while colorimetric values each associated with a corresponding one of color patches for the ink C among the colorimetric values D are each denoted by a black dot. In FIG. 9, a full line L3 connecting the individual correction target values TG (the white dots) is a straight line (or a curved line) obtained by interpolating the correction target values TG, and a chain double dashed line L4 connecting the individual colorimetric values D (the black dots) is a straight line (or a curved line) obtained by interpolating the colorimetric values D. It can be understood from FIG. 9 that, in the case where the printer 20 whose device body is different from that of the reference machine 40 is used in printing, even when, just like in the case of the reference machine 40, printing of color patches onto the first paper is performed on the basis of a set of common data (a set of test pattern data), there arises, for each color patch, a difference between a color value (a colorimetric value D) and a correction target value TG.

When generating the first correction table T1, as shown in an enlarged portion F as an example in FIG. 9, the correction value generation section F6 selects a correction target value TG ((a*, b*)=(a3, b3*)) corresponding to a grayscale value (Cm) of one of the color patches regarding the C ink. Further, among grayscale values each associated with a corresponding one of color values on the chain double dashed line L4, a grayscale value (Cm') associated with a color value ((a*, b*)=(a4*, b4*)) which is closer to the selected correction target value TG ((a*, b*)=(a3*, b3*)) than any other color value on the chain double dashed line L4 is selected, and this selected grayscale value Cm' is specified as a post-conversion value of the grayscale value Cm. The correction value generation section F6 repeatedly carries out such a task for specifying a conversion relation between grayscale values regarding a selected one of correction target values TG each associated with a grayscale value of a corresponding one of all color patches regarding the C ink. Further, the correction value generation section F6 further interpolates the conversion relation having been obtained for each grayscale value, and thereby generates a table (the first correction table T1) which continuously defines conversion relations within the whole grayscale range from a grayscale value "0" to a grayscale value "255". The correction value generation section F6 also generates the first correction table T1 for each of the M, Y, and K inks other than the C ink.

It can be said that the first correction table T1 having been generated in this way is a set of correction values for correcting discharged ink amounts so as to compensate for a deviation of color reproductivity specific to the characteristics of the printer 20 (i.e., a deviation when the color reproductivity of the reference machine 40 is made a baseline). In addition, in the printing control processing (FIG. 3) for causing the printer 20 to perform printing of an image having been optionally selected by a user, in the case where the user has selected the first paper as paper for use in the printing, in step S120 shown in FIG. 3, it is sufficient for the ink amount data correction section F3 merely to correct the set of ink amount data having been acquired in step S110 by using the first correction table T1.

In step S330, the control device 10 generates the second correction table T2 on the basis of the characteristic conversion table T0 and the first correction table T1, and stores the generated second correction table T2 into a predetermined storage area (for example, the HD 16 shown in FIG. 1). Processing in step S330 is processing performed by the correction value generation section F6, and corresponds to "a second correction value generation process" in appended claims. In the case where the control device 10 has already performed the above correction target value generation processing, when performing processing in step S330, it is sufficient for the control device 10 merely to read out the characteristic conversion table T0 having been generated and stored by the control device 10 itself from a predetermined storage area (for example, the HD 16). Further, in the case where the above characteristic conversion table generation processing has been performed by a control device different from the control device 10 (i.e., a control device which is possessed by a manufacturer having manufactured the printer 20 and which controls the reference machine 40), the control device 10 acquires the characteristic conversion table T0 from the outside, just like in the case where, in step S320, the correction target values TG have been acquired from the outside.

FIG. 10 illustrates an example of a procedure of generating the second correction table T2 in step S330. The correction value generation section F6 corrects the first correction table T1 for a certain color ink (for example, the C ink) by using the characteristic conversion table T0 for the relevant color ink (the C ink), and thereby generates the second correction table T2 for the relevant color ink (the C ink). In the first correction table T1, pre-conversion input grayscale values (for example, an input grayscale value Cm) and post-conversion output grayscale values (for example, an output grayscale value Cm') are set such that each of the pre-conversion input grayscale values (the input grayscale value Cm) is associated with a corresponding one of the post-conversion output grayscale values (the output grayscale value Cm'). Similarly, in the second correction table T2, the above pre-conversion input grayscale values (the input grayscale value Cm) and post-conversion output grayscale values (for example, an output grayscale value Cm") are set such that each of the pre-conversion input grayscale values (the input grayscale value Cm) is associated with a corresponding one of the post-conversion output grayscale values (the output grayscale value Cm"). The correction value generation section F6 inputs, for example, the output grayscale value Cm' into the characteristic conversion table T0, and then, sets a grayscale value resulting from a conversion by the characteristic conversion table T0 into the second correction table T2 as the output grayscale value Cm". Such a correction of the first correction table T1 by using the characteristic conversion table T0 is made for all grayscale values. In addition, when a correction is made by inputting the output grayscale value Cm' into the characteristic conversion table T0, a value which results from normalization of a range of grayscale values from "0" to "255" into a range of percentages from "0" to "100" and which corresponds to the output grayscale value Cm' is input. Further, an output value resulting from a correction by the characteristic conversion table T0 is converted into a value resulting from normalization of a range of percentages from "0" to "100" into a range of grayscale values from "0" to "255", and the converted value is made the output grayscale value Cm". The correction value generation section F6 also corrects, for each of the M, Y, and K inks other than the C ink, the first correction table T1 by using the characteristic conversion table T0 corresponding to the color ink, and thereby generates the second correction table T2 for each of the color inks.

6. Summary

According this embodiment, in the case where the printer 20 carries out calibration for printing using the second paper (for example, mat paper), that is, in the case where the printer 20 acquires correction values (the second correction tables T2) required for printing using the second paper, processing is performed such that: the printer 20 is caused to perform printing of a test pattern on the first paper (for example, glossy paper) (step S300); colorimetric values D of the test pattern are acquired (step S310); the first correction table T1 is generated on the basis of the colorimetric values D and reference colorimetric values (the correction target values TG) for the test pattern printed on the first paper (step S320); and the second correction tables T2 are generated on the basis of the first correction table T1 and the characteristic conversion table T0 for use in converting the characteristic of the first paper into the characteristic of the second paper, a color reproduction range of the second paper being smaller than that of the first paper (step S330).

It can be said that the second correction table T2 generated in this way is a set of correction values which compensates for a deviation of color reproductivity specific to the characteristics of the printer 20 relative to the color reproductivity of the reference machine 40, and which further compensates for a deviation between color reproductivity of the first paper and color reproductivity of the second paper. Accordingly, as having been described with reference to FIG. 3, when, actually, causing the printer 20 to perform printing using the second paper regarding an optionally selected image, through a method of correcting discharged ink amounts by using the second correction table T2 (step S120), a perceived color substantially equal to a perceived color obtained when printing using the second paper regarding the same image is performed by the reference machine 40 can be obtained in the result of the printing by the printer 20.

According to this embodiment, in the procedure until the completion of the generation of the second correction table T2, the use of the second paper is just once in the process of printing the test pattern during the characteristic conversion table generation processing (FIG. 4), and in other processes of causing the reference machine 40 to perform printing of the test pattern to acquire the correction target values TG and causing the printer 20 to perform printing of the test pattern to acquire the colorimetric values D (in steps S300 and S310 in FIG. 8), the first paper is used as a substitution for the second paper. Particularly, there are a large number of opportunities of causing the printer 20 to perform printing of the test pattern (step S300) because the printing of the test pattern by the printer 20 is necessary to be carried out for each of mass-produced printers 20 as well as when a temporal change of ink discharge performance in each of the printers 20 occurs. Nevertheless, the second paper cannot always be prepared when causing the reference machine 40 or the printer 20 to perform printing of the test pattern, and even though the second paper can be prepared, a user may be required not to use the second paper as much as possible because the second paper is relatively expensive and is hard to be obtained. According to this embodiment, it is possible to carry out the calibration for the second paper by using the first paper, and thus, such a problem can be solved.

Further, in this embodiment, the first paper's characteristic having a relatively large color reproduction range is converted into the second paper's characteristic having a color reproduction range smaller than that of the first paper's characteristic, and thus, it can be said that the accuracy of the conversion is high. Specifically, as shown in an example of FIG. 5, a color value (a colorimetric values A) which is obtained by performing colorimetry of a color patch printed on the first paper (glossy paper) basically continues to increase along with the increase of a corresponding ink amount (a grayscale value); while a color value (a colorimetric value B) which is obtained by performing colorimetry of a color patch printed on the second paper (mat paper) plateaus, and the rate of increase thereof rapidly slows down when the ink amount (the grayscale value) exceeds a relatively large ink amount (grayscale value).

Under such a situation, supposedly, if the characteristic of the second paper is converted into the characteristic of the first paper, particularly, a small difference in a certain conversion relation at the higher grayscale value side (the difference being a difference which occurs depending on the accuracy of interpolation when the characteristic conversion table T0 is generated by performing interpolation processing) largely influences the result of the conversion. That is, a generated characteristic conversion table does not become stable, and it is relatively difficult to perform conversion with accuracy across the entire grayscale range. In contrast, in this embodiment, in the case where the characteristic of the first paper is converted into the characteristic of the second paper, even though there is some difference in a certain conversion relation at the higher grayscale value side, the result of the conversion is not largely influenced. That is, a generated characteristic conversion table becomes stable, and it is easy to perform conversion with accuracy across the entire grayscale range. That is, in this embodiment, when calibration for a certain type of paper is carried out, a pattern in which a type of paper having a color reproduction range larger than that of the certain type of paper is used as a substitution for the certain type of paper is exclusively adopted, and this exclusive adoption of such a pattern makes it easier to ensure the accuracy of finally acquired correction values (the second correction table T2) for the certain type of paper.

What is claimed is:

1. A printing control method comprising:
    acquiring, in a colorimetric value acquisition process, colorimetric values of a pattern which is printed on first paper by a printing head of a reference printer which discharges an ink onto the first paper;
    generating, in a first correction value generation process, first correction values each for correcting a corresponding one of amounts of the ink to be discharged onto the first paper, on the basis of the colorimetric values and reference colorimetric values of the pattern printed on the first paper;
    generating, in a second correction value generation process, second correction values for each pixel in a set of ink amount data, on the basis of the first correction values and characteristic conversion coefficients for a conversion of a characteristic of the first paper into a characteristic of second paper, a color reproduction range of the characteristic of the second paper being smaller than a color reproduction range of the characteristic of the first paper; and when printing is performed on the second paper by a printing head of a second printer which discharges the ink onto the second paper, correcting, in an ink amount correction process, each of amounts of the ink to be discharged onto the second paper by the printing head of the second printer, in accordance with a corresponding one of the second correction values, wherein the characteristic conversion coefficient is obtained by the reference printer printing the pattern on the first paper and the second paper, wherein the reference printer is operated by a manufacturer of the second printer and the colorimetric value acquisition process is performed by the manufacturer, and wherein the second correction value is generated based on the first correction value and the characteristic conversion coefficient, such that it is unnecessary to perform calorimetric value acquisition processing of the second sheet in the second printer.

2. The printing control method according to claim 1, wherein the first paper is glossy paper, and the second paper is mat paper.

3. The printing control method according to claim 1, wherein, in the second correction value generation process, the second correction values are generated for each of colors of a plurality of inks including the ink which are discharged by the reference printer and the second printer, and in the ink amount correction process, the amounts of ink for each of colors of the plurality of inks are corrected by using the second correction values for the each of colors of the plurality of inks.

4. A printing control device comprising:

a colorimetric value acquisition portion that acquires colorimetric values of a pattern which is printed on first paper by a printing head of a reference printer which discharges an ink onto the first paper;

a first correction value generation portion that generates first correction values each for correcting a corresponding one of amounts of the ink to be discharged onto the first paper, on the basis of the colorimetric values and reference colorimetric values of the pattern printed on the first paper;

a second correction value generation portion that generates second correction for each pixel in a set of ink amount data, on the basis of the first correction values and characteristic conversion coefficients for a conversion of a characteristic of the first paper into a characteristic of second paper, a color reproduction range of the characteristic of the second paper being smaller than a color reproduction range of the characteristic of the first paper; and an ink amount correction portion that, when printing is performed on the second paper by a printing head of a second printer which discharges the ink onto the second paper, corrects each of amounts of the ink to be discharged onto the second paper by the printing head by the second printer, in accordance with a corresponding one of the second correction values, wherein the characteristic conversion coefficient is obtained by the reference printer printing the pattern on the first paper and the second paper, wherein the reference printer is operated by a manufacturer of the second printer and the colorimetric value acquisition process is performed by the manufacturer, and wherein the second correction value is generated based on the first correction value and the characteristic conversion coefficient, such that it is unnecessary to perform calorimetric value acquisition processing of the second sheet in the second printer.

* * * * *